(12) United States Patent
Nyman et al.

(10) Patent No.: US 8,020,710 B2
(45) Date of Patent: *Sep. 20, 2011

(54) METHOD AND EQUIPMENT FOR LIQUID-LIQUID EXTRACTION

(75) Inventors: Bror Nyman, Ulvila (FI); Eero Ekman, Pori (FI); Stig-Erik Hultholm, Pori (FI); Pertti Pekkala, Espoo (FI); Juhani Lyyra, Espoo (FI); Launo Lilja, Pori (FI); Raimo Kuusisto, Espoo (FI)

(73) Assignee: Outotec Oyj, Espoo (FI)

( * ) Notice: Subject to any disclaimer, the term of this patent is extended or adjusted under 35 U.S.C. 154(b) by 93 days.

This patent is subject to a terminal disclaimer.

(21) Appl. No.: 12/561,838

(22) Filed: Sep. 17, 2009

(65) Prior Publication Data

US 2010/0078380 A1 Apr. 1, 2010

Related U.S. Application Data

(62) Division of application No. 10/549,721, filed as application No. PCT/FI2004/000135 on Mar. 15, 2004, now Pat. No. 7,678,275.

(30) Foreign Application Priority Data

Mar. 19, 2003 (FI) ..................................... 20030410

(51) Int. Cl.
*B01D 17/025* (2006.01)
*B01D 11/00* (2006.01)

(52) U.S. Cl. ........ 210/511; 210/519; 210/521; 210/522; 210/801; 210/802; 422/258; 422/259; 366/136; 366/150.1; 366/154.1; 423/658.5

(58) Field of Classification Search .................. 210/194, 210/195.1, 340, 511, 512.1, 521, 522, 634, 210/804–806, 519, 801, 802; 422/256–259; 366/136, 137, 159.1, 150.1, 154.1; 423/8, 423/24, 54, 109, 139, 658.5, 55, 140
See application file for complete search history.

(56) References Cited

U.S. PATENT DOCUMENTS

| | | | | | |
|---|---|---|---|---|---|
| 2,118,157 | A | * | 5/1938 | Camp | .......................... 210/800 |
| 3,419,145 | A | * | 12/1968 | De Celts | ....................... 210/802 |
| 3,607,104 | A | | 9/1971 | Blickle et al. | |
| 3,997,445 | A | | 12/1976 | Hannestad | |
| 4,292,277 | A | | 9/1981 | Bonney et al. | |
| 4,721,571 | A | | 1/1988 | Nyman et al. | |
| 4,747,948 | A | * | 5/1988 | North | .......................... 210/633 |
| 5,558,780 | A | | 9/1996 | Vancas | |
| 5,662,871 | A | | 9/1997 | Nyman et al. | |
| 6,083,400 | A | | 7/2000 | Nyman et al. | |
| 6,132,615 | A | | 10/2000 | Nyman et al. | |
| 6,176,608 | B1 | | 1/2001 | Nyman et al. | |
| 6,500,232 | B2 | * | 12/2002 | Dorlac et al. | ................... 75/743 |
| 7,390,420 | B2 | | 6/2008 | Nyman et al. | |
| 7,465,402 | B2 | | 12/2008 | Nyman et al. | |
| 7,517,461 | B2 | | 4/2009 | Nyman et al. | |

* cited by examiner

*Primary Examiner* — Joseph Drodge
(74) *Attorney, Agent, or Firm* — Buchanan Ingersoll & Rooney PC

(57) ABSTRACT

The invention relates to a method for reversing the dispersion formed in the mixing section of liquid-liquid extraction and kept condensed in the separation section and the separated solutions form the rear end of the separation section to flow back towards the feed end of the separation section. The invention also refers to the extraction equipment for implementing the reversed flow.

19 Claims, 3 Drawing Sheets

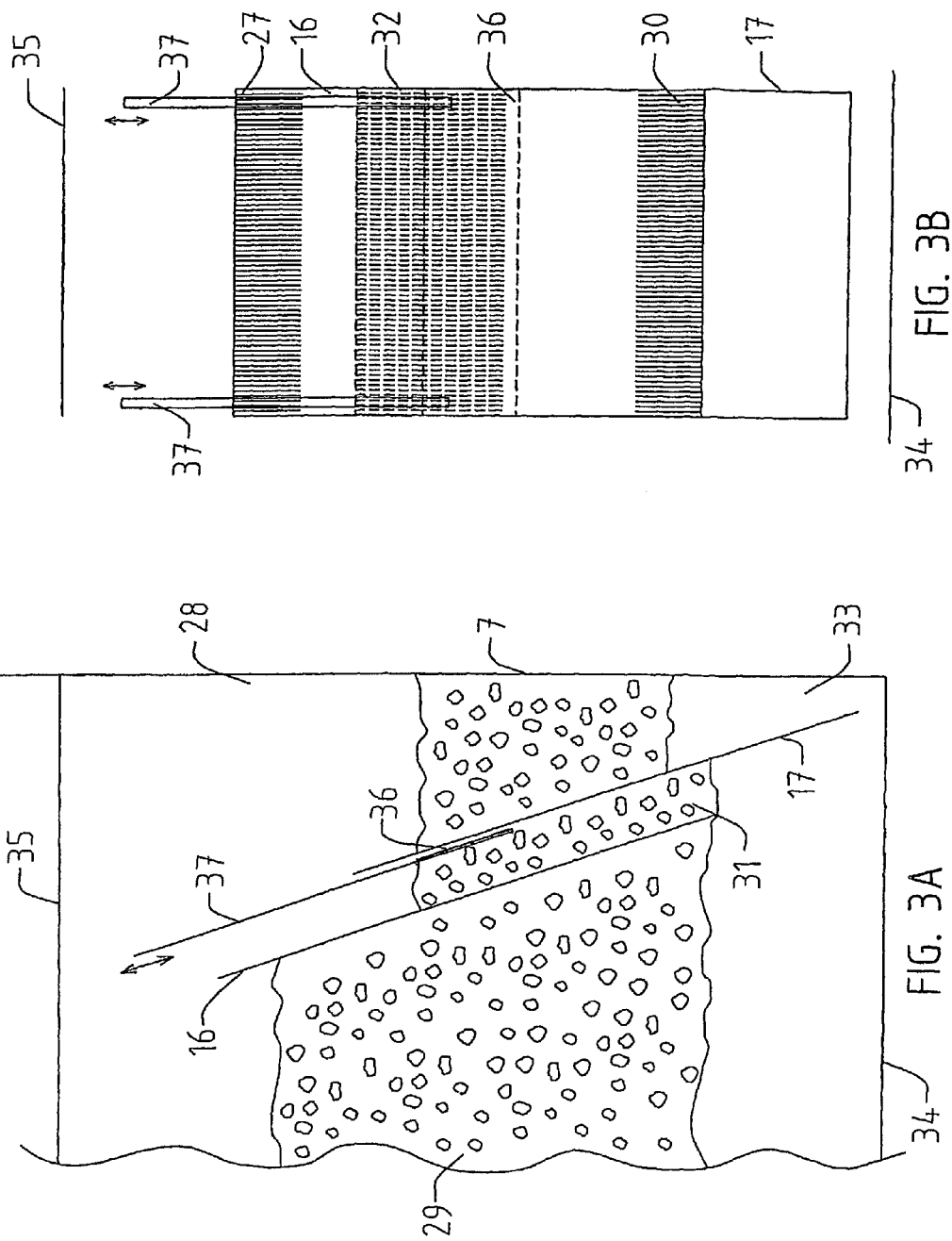

METHOD AND EQUIPMENT FOR LIQUID-LIQUID EXTRACTION

CROSS REFERENCE TO RELATED APPLICATIONS

Figure 1:
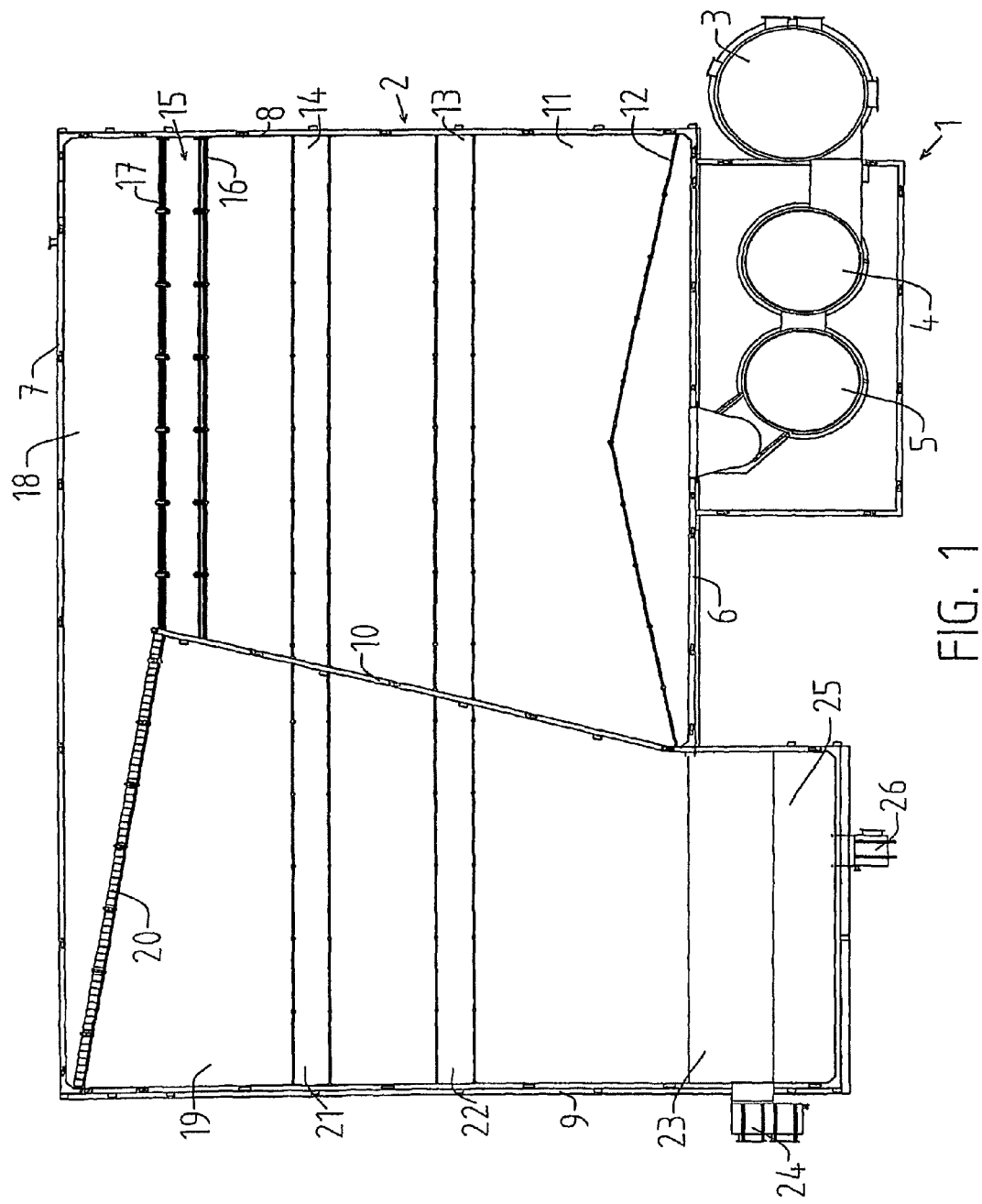

This application is a divisional of U.S. application Ser. No. 10/549,721, now U.S. Pat. No. 7,687,275, which is the U.S. National Phase of International Application No. PCT/FI2004/000135, filed Mar. 15, 2004, which claims priority to Finish Patent Application No. 20030410, filed on Mar. 19, 2003, the contents of each of which are hereby incorporated by reference.

The invention relates to a method for reversing the dispersion formed in the mixing section of liquid-liquid extraction and kept condensed in the separation section and the separated solutions from the rear end of the separation section to flow back towards the feed end of the separation section. The invention also refers to the extraction equipment for implementing the reversed flow.

The method and equipment relate in particular to an extraction process used in the recovery of metals. Extraction facilities recovering valuable metals such as copper, uranium, cobalt, nickel, zinc and molybdenum fall into this category. In all these extraction processes, a valuable metal-containing aqueous solution is brought into contact with an organic solution in the mixing section of extraction. Thus a dispersion of two solutions that are insoluble in each other is formed. The solutions in the dispersion are separated from each other into two successive layers in the separation section of extraction with an ever-decreasing dispersion band between the separating layers. During the mixing stage at least one of the valuable metals in the aqueous solution is transferred to the organic phase, from which the valuable metal is recovered by stripping. Extraction is performed in an arrangement of equipment, where the mixing and settling sections are either located one on top of the other (column) or horizontally on more or less the same level. Almost always in cases when large-scale extraction of weak solutions is concerned, such as copper extraction, the equipment is positioned in an substantially horizontal position. When we refer to extraction hereinafter, we are referring substantially to equipment positioned on the same level.

The recovery of metals often requires many mixing-separation units or mixer-settlers, which are usually connected to each other on the countercurrent principle. The number of extraction steps varies greatly depending on the process and may be between 2 and 20. For example in copper extraction there are usually around 4-6 steps. So far units have almost always been placed at an angle of 180 degrees to the following unit, so that the solution pipelines stay short. This has been desired even though this arrangement has its own drawbacks such as difficult instrumentation, electrification and construction of service platforms.

Recently some solutions have been presented, with the aim of getting all the extraction steps to face the same direction. These are described for instance in conference publications "Alta 1996 Copper Hydrometallurgy Forum", Oct. 14-15, 1996, Brisbane, Australia: Hopkins, W.: "Reverse Flow Mixer settlers"and "Randol at Vancouver '96", Conference Proceedings, Nov. 12-15, 1996, Vancouver, British Columbia, pages 301-306. In the latter publication there is a drawing on the bottom left of page 302 presenting a principle drawing of four different separation sections. The first is a conventional model, where the dispersion is fed from one end into the separation section and the separated solutions are removed from the other end. The next is known as the Krebs model, also described in U.S. Pat. No. 4,844,801,which has the characteristic that the dispersion is conveyed along a launder overhead the settler to the end of the settler furthest from the mixer. There the dispersion is routed into the actual settler space to flow towards the mixer. The third is the Falconbridge model, where the settler is separated with partial partitions and the dispersion flows in the first half of the settler away from the mixing section and in the second half back towards the mixing section. According to the caption, the residence time of the solution in the settler depends on whether the solution is in the inner or outer edge of the settler. In the fourth, the Bateman model, which is also described in U.S. Pat. No. 5,558,780, the dispersion flows along a narrow channel in the side of the settler to the furthest end of the settler and from there in the actual settler space back towards the extraction mixing section. The two latter represent what is known as reverse flow-type settlers.

In the Falconbridge model it is possible that the dispersion that has flowed along the inner edge of the settler does not have time to separate into its own phases so well as that which flowed along the outer edge. The principle drawing does not show in more detail how the flow is reversed in practice either. The settler described in U.S. Pat. No. 5,558,780 has its own problems forming a uniform return flow in the settler. As a result the separation capacity of the settler remains incomplete and the entrainment of residual droplets in the separated solutions is high.

A method has now been developed in accordance with the present invention, where the dispersion formed in the mixing section of a metal extraction process is routed to a separation section, divided substantially into two parts with a partition wall in the same direction as the sidewalls. The dispersion and the phases separating from it flow first as an outward flow from the central part of the separation section to the rear end, where the entire amount of solution flowing in the separation section is reversed as a return flow towards the front end of the separation section. The outward flow of solutions is regulated to be dispersion-dominant i.e. the dispersion is kept as a strong layer in the outward flow side of the separation section by means of a reversing element situated in its rear end, because a strong dispersion band helps the formation of pure solution phases. In addition, the reversing element divides the separated solutions into sub-flows, which ease the reversal of the solution flow into a return flow. In order to maintain a strong dispersion band the cross-section of the outward flow field also preferably diminishes in size towards the rear end of the separation section and the cross-section of the return flow field diminishes in size towards the front end of the separation section as well, too. The dispersion that has flowed through the reversing element and the separated solutions are conducted through a picket fence at the front end of the return flow field, by which means the direction of the solutions is reversed finally towards the front end of the separation section.

The present invention also relates to a settler equipment, where a substantially rectangular settler is comprised of a front and rear end as well as sidewalls and a bottom. The width of the settler is substantially greater than its length. The settler is divided by a partition wall into two sections, whereby the partition extends preferably to a distance that is 85-95% of the total length of the settler. Two flow fields are formed in the settler by means of the partition, an outward flow field and a return flow field. The settler partition wall is positioned between the sidewalls substantially in the direction of the sidewalls, but nevertheless preferably in such a way that the cross-section of the flow fields decreases. At least one reversing element is positioned in the outward flow field in the immediate vicinity of the settler rear end, formed of an element extending from the wall to the partition wall. The function of the reversing element is to regulate the thickness of the dispersion band and to achieve the controlled turning of the different phases in the rear of the settler. There is a picket fence made between the rear end and the partition wall on the return flow field side, which straightens out the settler flow towards the front end of the settler.

The substantial features of the invention will be made apparent in the attached claims.

The flow of the dispersion and separated phases from the front end of the separation space towards the rear end is called the outward flow and the flow of all these phases from the rear end of the separation space back towards the front end is called the return flow. Likewise the area of the settler where the outward flow occurs is called the outward flow field and correspondingly the other side is called the return flow field.

The dispersion from a liquid-liquid extraction mixing section is fed in the controlled manner into the front end of the separation section in the outward flow field. Obviously, the aim is to spread the flow across the entire cross-section of the outward flow field. To further this picket fences or other suitable elements can be used. In the method according to the invention, the outward flow is regulated so that it is dispersion-dominant, i.e. the dispersion is kept as thick band between the phases. To bring this about, at least one reversing element is placed at the rear end of the outward flow field, which regulates the thickness of the dispersion layer and the progress of the dispersion. The phases that have separated from the dispersion are made to flow relatively freely, but the unseparated dispersion is dammed up by means of at least one reversing element placed in the rear of the outward flow field for this purpose.

The equipment according to the invention includes at least one reversing element situated in the rear end of the outward flow field of the settler (separation section). The reversing element extends as far as the sidewalls of the separation section outward flow field i.e. from one of the sidewalls to the end of the partition wall. The reversing element for its part comprises at least two plate-like parts or reverser plates, placed at different heights and substantially perpendicular to the longitudinal axis of the settler (in the direction of flow of the solutions). The direction of flow of the dispersion in the area formed between the reverser plates, in the reversing channel, is almost vertical, because the dispersion is made to flow above or below each reverser plate into the reversing channel. Changing the direction of flow substantially vertical improves the separation of the dispersion into pure solution layers above and below the dispersion. The reversing element can be positioned at different stages of extraction such as both in the actual extraction and also in any washing and stripping separation sections.

It is characteristic of the method and equipment that the dispersion stream is prevented from flowing forwards directly by arranging a reversing element in the rear end of the outward flow field extending above this field. Preferably the reversing element comprises at least two plate-like components, which are situated against the outward flow. In order for the dispersion to move past the reversing element, in the first stage it must be pressed against the first plate-like part of the reversing element and under it into the reversing channel, which is formed between the plate-like parts of the reversing element. From the reversing channel the dispersion surface is made to rise so that extends to flow over the second plate-like part of the reversing element. There are at least two plate-like parts in one reversing element, but the number of said components can also vary. The first plate-like part of the reversing element, or underflow plate, and subsequently every second part is located substantially higher in the separation section than the second plate-like part, or overflow plate, and every other part after that.

The first plate-like part belonging to the reversing element, the underflow plate, is located in the separation section at a height where its upper edge extends above the dispersion band into the organic solution phase. When the separated solutions and the dispersion band between them flow from the feed end of the separation section towards the rear end, the dispersion band is pressed against the first reverser plate. The dispersion should accumulate in such quantities that since being heavier than the separated organic solution, it penetrates from under the underflow plate, through the riser channel or channels between the reverser plates and from there on to the rear end of the separation section, where the dispersion and separated phases are turned back to the return flow field. The larger the settler, the larger the flow required. A dense dispersion attains an improved degree of solution separation, in other words, the amount of entrainment in each solution, both aqueous and organic, is decreased.

The first reverser plate, the underflow plate, is basically solid, but it is equipped with vertical slots or a slotted zone in its upper and lower section. The upper edge of the plate is whole and the slotted zone starts just below it. The upper edge of the plate and its slotted zone extend into the organic solution. The height of the slotted zone of the upper section of the plate is 5-25% of the total height of the reverser plate and 1-10% of the total solution height in the rear of the separation space. The organic solution flows via the slotted zone into the rear of the settler divided into several sub-flows, in practice 10-100. Dividing the solution into sub-flows aids its smooth turning from the rear towards the return flow fields.

The lower edge of the underflow plate is entire, but immediately above it there are some vertical slots. The height of the slotted zone is about 5-15% of the total height of the plate. The lower edge of the underflow plate extends to the bottom part of the separation section. In practice the lower edge of the underflow plate is at a distance from the bottom equivalent to 15-30% of the total height of the solution (solution depth) of the separation section (settler). The dispersion dammed up in front of the underflow plate flows via the slotted zone of the lower section into the riser or reversing channel between the reverser plates. The lower section of the slotted zone also helps to divide the aqueous solution flowing in the bottom at least partially into sub-flows, which promotes the smooth reversal of the aqueous solution in the rear section. The number of sub-flows is in practice the same as in the organic solution.

The second reverser plate, the overflow plate, of the reversing member is the same type as the first i.e. basically solid. The upper edge of the overflow plate is equipped with a slotted zone like that described above in relation to the upper edge of the underflow plate. The purpose of the slots in this case too is to promote the even distribution of the dispersion into the rear of the separation section. The lower edge of the overflow plate is placed clearly lower than the lower edge of the underflow plate, but in such a way however, that there remains unimpeded flow space for the separated aqueous solution. In practice, the lower edge of the overflow plate is at a distance from the bottom that is 3-10% of the total solution height in the separation section. The upper edge of the overflow plate is placed below the surface of the organic solution. In practice the upper edge of the second reverser plate is placed below the solution surface at a distance that is 20-40% of the solution height in the separation section. The distance between the underflow plate and the overflow plate is specified so that the rising speed of the dispersion in the reversing channel between the plates is in the region of 0.05-0.3 m/s. In practice this means that the distance between the plates is around 0.5-2 m, when the feed of the dispersion into the separation section is over 1000 m³/h. If the reversing element comprises several reverser plates, the slotted zones are placed in the upper and lower edges of the corresponding plates.

It is advisable to place flow blocking plates in front of the upper section of the overflow plate, which are made up of solid plates in the direction of the overflow plate. Blocking plates are placed in the slotted zone of the overflow plate. The vertical position of the blocking plates can be changed. Blocking plates are set in the immediate vicinity of the overflow plate and by adjusting their vertical position the desired part of the slotted zone of the overflow plate can be covered. When the blocking plate covers the entire slotted zone, the surface of the dispersion band rises to the level of the upper edge of the overflow plate and blocking plate. When the upper edge of the blocking plate is lowered, the thickness of the dispersion band decreases and the thickness of the organic phase layer becomes thicker. In practice, the overflow plate blocking plate is comprised of several parts, each of which can be adjusted individually. Thus it is possible to balance the sideways flows of the entire outward flow field. The same function can be achieved by lifting or lowering the whole overflow plate, but in practice implementing this is more difficult, at least in large extraction facilities.

In most extraction applications the organic solution layer is not as thick as the aqueous layer. With the method and equipment according to the present invention it is possible to increase the area of the organic phase in the rear space of the separation section by positioning the reversing element plates to deviate from the vertical so that the plates are inclined against the outward flow. This means that the plates are placed at a 10-30° angle to the vertical, so that their lower edge is nearer than their upper edge to the rear end of the separation section. The purpose of inclining the reverser plates is to obtain a location of the dispersion band in the vertical direction at a level that corresponds to the final interface of the organic and aqueous phase in the return flow field. This furthers final phase separation in the return flow field.

The separated phases that have flowed via the reversing element into the rear of the settler and the dispersion band flowing between them are made to turn in the rear space back towards the front end of the settler by routing them through a picket fence of special construction. The picket fence reverses the return flow longitudinally towards the front end of the settler. The picket fence is supported at one end to the end of the partition wall and the other to the sidewall, either near the back wall or at the corner formed by the back wall and the sidewall.

The picket fence situated at the front of the return flow field is made up of a normal picket fence, with guiding plates positioned behind its vertical slots. Guiding plates are set behind the vertical slots of the picket fence in relation to the direction of solution flow i.e. they are at the front end of the settler. Guiding plates are turned behind the vertical slots so that the solution flow channel is narrower at the sidewall of the separation space and wider near the partition wall. This kind of solution reverses the flow of the solutions along the length of the settler. The picket fence solution presented is described in principle in U.S. Pat. No. 6,132,615. In it the structures of the picket fence are positioned substantially vertically, but it is characteristic of this embodiment of the invention that the structures form an angle to the vertical corresponding to the outward flow field reverser plates. In this case this means that the plates of the picket fence are inclined with the upper edge towards the front end of the settler. The picket fences extend down to the bottom of the settler.

The area between the rear reversing element and the picket fence, the rear space, is dimensioned so that the flow rate of the streams there, of both the separated phases and the dispersion, is around 0.15-0.3 m/s. Just before the rear space, the controlled reverse of the solution flow direction is achieved by means of the reversing element located at the end of the outward flow field and the picket fence placed immediately at the front of the return flow field. The inclination of the reversing element and the picket fence also even out the turning of the flow. Other separation-improving elements may also be located in the return flow field.

At the front end of the return flow field the pure solutions that have separated from the dispersion are removed from the settler, the organic solution as overflow into the organic solution headbox and the aqueous solution into its own headbox. The headbox is located outside the actual settler in front of the return flow field. When the mixers in the mixing section are located in the corresponding position in front of the outward flow field, this constitutes a space-saving solution. When all the extraction steps can be placed in the same direction, the pipelines can be shorter.

Figure 2B:
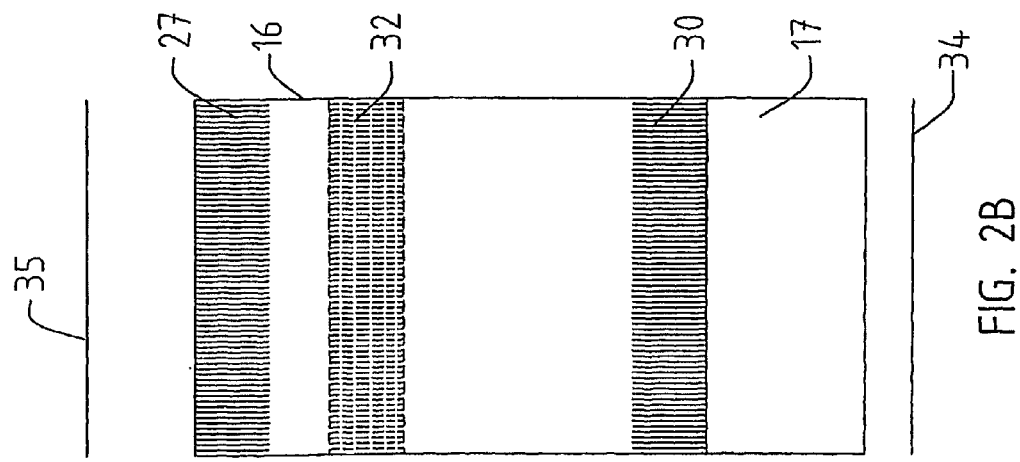
Figure 2A:
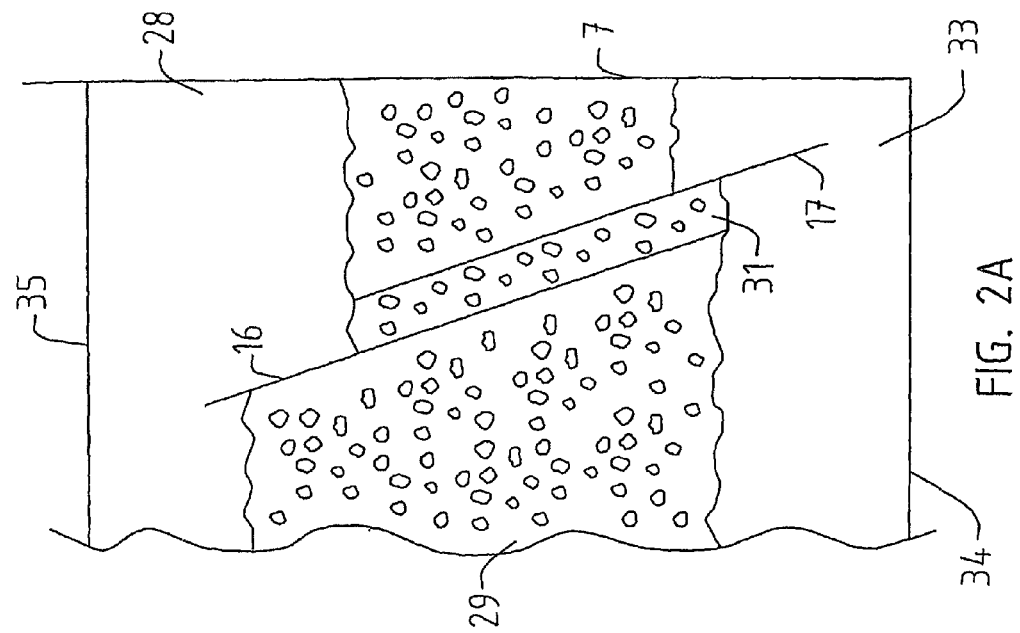

The equipment according to the invention is described further by the attached drawings, where FIG. 1 shows an arrangement of an extraction step according to the invention as seen from above, FIG. 2A is a side view of a principle drawing of the reverser plates of the reversing element, FIG. 2B is a principle drawing of the reverser plates of the reversing element as seen from the rear end, FIG. 3A is another principle drawing of the reverser plates of the reversing element seen from the side, and FIG. 3B is another principle drawing of the reverser plates of the reversing element as seen from the rear.

The extraction step according to FIG. 1 comprises a mixing section 1 and a separation section or settler 2. The mixing section includes in this case a pump tank 3 and mixers 4 and 5. The aqueous solution and organic solution are directed first to the pump tank and from there on to the first and second mixer. Obviously, the number of pump tanks and mixers may vary according to the amount of solution to be fed. The pump tank is preferably that described in U.S. Pat. No. 5,662,871 for example.

Settler 2 comprises the front end 6, rear end 7, sidewalls 8 and 9 and a partition wall 10 in principle in the same direction as the sidewalls. The partition wall, however, is preferably placed so that the cross-sectional area of the flow fields formed diminishes in the direction of flow. The partition may form a 5-15° angle with the longitudinal axis of the settler. The dispersion of solutions from the final mixer is routed to the front end 6 of the settler in the outward flow field 11 (not shown in detail in the drawing). The outward flow field is equipped with picket fences and/or other suitable elements 12, 13 and 14 to control the solution flow. At the rear end of the outward flow field there is a reversing element 15, which itself is composed of at least two reverser plates, an underflow plate 16 and an overflow plate 17. The rear section of the settler, the back 18 comprises the space left between the reversing element 15 and the picket fence 20 located at the front end of the return flow field 19. In addition to the picket fence 20 at the front, the return flow field is also equipped with other desired elements 21 and 22 for controlling the flow. The cross-sectional area of the return flow field also diminishes in the direction of flow towards the front end.

The headboxes of the separated solutions in the settler are preferably placed in front of the front end 6, on the side of the return flow field 19. Thus the organic solution is recovered as an overflow from the organic solution headbox 23 via either one or several discharge units 24, from either just one of the edges or both. In the same way the aqueous solution is recovered from the aqueous solution headbox 25 via one or several discharge units 26 as required. The precise location of the discharge units is decided by where the separated solutions will be fed to. There may also be two or several discharge units in both headboxes.

FIGS. 2A and 2B present a decision in principle from the reversing elements situated in the rear part of the outward flow field. The drawings show that the underflow plate 16 and the overflow plate 17 are located near the rear end 7. The upper edge of the underflow plate is equipped with a slotted zone 27, which extends inside the separated layer of the organic phase 28. The slotted zone distributes the organic solution to flow into the back of the settler as several substreams. The underflow plate dams up the dispersion 29 flowing between the separated solutions, and the dispersion is made to rise through the slotted zone 30 in the lower edge of the underflow plate into the reversing channel 31, and from there through the slotted zone 32 in the upper part of the overflow plate into the rear space of the settler. The lower edge of the underflow plate is unbroken and is extended into the separated aqueous solution 33, but, however, above the bottom 34. The surface 35 of the organic solution phase is likewise the solution height of the settler.

FIGS. 3A and 3B show another embodiment of a reversing member, in which a solid blocking plate 36 is placed in front of the slotted zone 32 in the upper part of the overflow plate 17. The blocking plate is a plate that can be lowered by means of its support structures 37 in the direction of the overflow plate. The height of the slotted zone 32 in the overflow plate of FIG. 3B is far greater than that shown in FIG. 2B, but it is now possible using the blocking plate to adjust the thickness of the dispersion and at the same time also that of the organic phase. In the case shown in the drawing the blocking plate is in the position whereby the lower part of the slotted zone is covered by the blocking plate. In practice this means that the dispersion band is able to discharge into the back of the settler at the level of the upper edge of the blocking plate, so that the layer of organic phase can become thicker than for instance in the case of FIG. 2. When the blocking plate is in its upper position, it can even cover the slotted zone completely and the dispersion band becomes thicker and the layer of organic phase becomes thinner.

Of course it is clear that the blocking plate can be installed to operate in other ways than that described above, but it is substantial that the thickness of the dispersion band and likewise that of the organic phase can be adjusted by closing part of the slotted zone of the overflow plate. As stated earlier, it is preferable to construct the blocking plates from several separate components, so that the layer thickness can be adjusted locally.

The method and equipment of the present invention now make it possible to handle even large solution streams economically and operationally in a cost-effective extraction step solution comprising a mixing section and reverse flow separation section as described above. Using the method and equipment of the present invention first of all the thickness of the dispersion band of the stream can be controlled and thus achieve pure solutions. Secondly, a controlled reversal of the outward flow field into a return flow field can be achieved by means of a regulating and reversing member in the rear section of the settler.

The invention claimed is:

1. A liquid-liquid extraction settler for controlled separation of a dispersion of aqueous solution and organic solution formed during metal recovery into separated aqueous and organic solution phases, comprising:
    a mixing section; and
    a separation section, comprising:
        a feed end;
        a rear end;
        two sidewalls;
            wherein said separation section has a longitudinal axis extending from the feed end to the rear end between the two sidewalls;
        a bottom;
        a headbox for each of the separated aqueous and organic solutions;
        a solid partition wall extending from the front end toward the rear end between the two sidewalls of the separation section and dividing the separation section into two sections, comprising an outward flow field and a return flow field;
        a reversing element which is disposed in the outward flow field near the rear end of the separation section and extends transversely relative to the longitudinal axis of the separation section from one of the two sidewalls to an end of the solid partition wall and comprising at least a first reverser plate and a second reverser plate situated at different heights and having a reversing channel between them; and
        a picket fence located at a front end of the return flow field in the rear end of the separation section, which is fastened at a first end at an end of the solid partition wall, and having a second end which is fastened to a sidewall near the rear end of the separation section, or to a corner formed by the sidewall and the rear end of the separation section.

2. The settler according to claim 1, further comprising guiding plates situated behind one or more slots in the picket fence to reverse the flow.

3. The settler according to claim 1, wherein the partition wall has a length that is 85-95% of a length of the separation section.

4. The settler according to claim 1, wherein the solid partition wall forms an angle of 5-150° with the longitudinal axis of the separation section, such that the cross-section of the outward flow field, the return flow field, or both, decrease in the direction of flow.

5. The settler according to claim 1, wherein the first reverser plate of the reversing element comprises an underflow plate located at a height above a height of the second reverser plate which comprises an overflow plate.

6. The settler according to claim 1, wherein the first reverser plate comprises an upper edge located inside a layer of organic solution in the separation section during operation.

7. The settler according to claim 1, wherein the first reverser plate has a lower edge disposed at a distance from the bottom of the separation section that is 15-30% of a height of solution in the separation section.

8. The settler according to claim 1, wherein the first and second reverser plates are mainly solid.

9. The settler according to claim 1, wherein said first reverser plate comprises an upper edge and a slotted zone formed in the upper edge over a distance corresponding to 5-25% of the height of the first reverser plate.

10. The settler according to claim 1, wherein said first reverser plate comprises a lower edge and a slotted zone formed in the lower edge over a distance corresponding to 5-15% of the height of the first reverser plate.

11. The settler according to claim 1, wherein said second reverser plate comprises an upper edge and a slotted zone formed in the upper edge over a distance corresponding to 5-15% of the height of the second reverser plate.

12. The settler according to claim 1, wherein the second reverser plate comprises a lower edge disposed at a distance from the bottom of the separation section that is 3-10% of a height of solution in the separation section.

13. The settler according to claim 1, wherein the second reverser plate comprises an upper edge that is placed a distance below a solution surface that is 20-40% of the height of a solution in the separation section.

14. The settler according to claim 1, wherein the first reverser plate, the second reverser plate, or both are disposed at an angle of 10-30° to the vertical.

15. The settler according to claim 1, wherein the first reverser plate, the second reverser plate, or both, comprise an upper edge that is inclined towards the feed end of the separation section.

16. The settler according to claim 1, wherein headboxes of the separation section are located in front of the return flow field at the feed end of the separation section.

17. The settler according to claim 1, wherein the mixing section is located in front of the outward flow field of the separation section.

18. The settler according to claim 1, wherein the settler further comprises a picket fence and/or other regulating elements to control the flow in the outward flow field.

19. A liquid-liquid extraction settler for controlled separation of a dispersion of aqueous solution and organic solution formed during metal recovery into separated aqueous and organic solution phases, comprising:
- a mixing section; and
- a separation section, comprising:
- a feed end;
- a rear end;
- two sidewalls;
- wherein said separation section has a longitudinal axis extending from the feed end to the rear end between the two sidewalls;
- a bottom;
- a headbox for each of the separated aqueous and organic solutions;
- a solid partition wall extending from the front end toward the rear end between the two sidewalls of the separation section and dividing the separation section into two sections, comprising an outward flow field and a return flow field;
- a reversing element which is disposed in the outward flow field near the rear end of the separation section and extends transverse relative to the longitudinal axis of the separation section from one of the two sidewalls to an end of the solid partition wall and comprising at least a first reverser plate and a second reverser plate situated at different heights and having a reversing channel between them;
- a solid blocking plate disposed in front of an upper part of the slotted zone of the second reverser plate wherein the blocking plate is parallel to the second reverser plate and is vertically adjustable via one or more support elements, and wherein the first reverser plate, the second reverser plate, or both, comprise an upper edge that is inclined towards the feed end of the separation section.

* * * * *